(12) United States Patent
Foo

(10) Patent No.: US 7,453,196 B2
(45) Date of Patent: Nov. 18, 2008

(54) FLUORESCENT LAMP WITH CAVITY TUBE

(75) Inventor: Onn Fah Foo, Kowloon (HK)

(73) Assignee: Mass Technology (H.K.) Limited, Kowloon, Hong Kong (CN)

( * ) Notice: Subject to any disclaimer, the term of this patent is extended or adjusted under 35 U.S.C. 154(b) by 456 days.

(21) Appl. No.: 11/176,084

(22) Filed: Jul. 7, 2005

(65) Prior Publication Data

US 2006/0006783 A1    Jan. 12, 2006

(30) Foreign Application Priority Data

Jul. 8, 2004 (CN) .................. 2004 2 0073880
Sep. 27, 2004 (CN) .................. 2004 1 0078388

(51) Int. Cl.
*H01J 17/22* (2006.01)
(52) U.S. Cl. .................. 313/490; 313/634; 313/565; 313/493; 220/2.1 R
(58) Field of Classification Search .................. 313/490, 313/634, 565, 493, 491; 220/2.1 R
See application file for complete search history.

(56) References Cited

U.S. PATENT DOCUMENTS

| | | | |
|---|---|---|---|
| 4,665,341 A * | 5/1987 | Imamura et al. | 313/493 |
| 5,739,633 A * | 4/1998 | Biro et al. | 313/490 |
| 6,268,694 B1 * | 7/2001 | Fujimoto | 313/491 |
| 6,437,504 B1 * | 8/2002 | Foo | 313/573 |
| 7,045,946 B2 * | 5/2006 | Kawase et al. | 313/493 |
| 7,173,254 B2 * | 2/2007 | Sauska et al. | 250/455.11 |

* cited by examiner

*Primary Examiner*—Joseph L Williams
(74) *Attorney, Agent, or Firm*—Alix, Yale & Ristas, LLP

(57) ABSTRACT

A fluorescent lamp uses new cold-end technology or an enveloped fluorescent lamp with high surface load. The lamp features a lamp tube, cathode, stem cap and wire, such that one end of the wire connected to the cathode is fixed on the stem cap and the other end of the wire is led out from the lamp tube. At least one cavity tube connecting through the lamp tube is disposed on the side of at least one lamp tube. Advantages of the fluorescent lamp include: (1) the temperature of cavity tube is not influenced directly with electrical arc since there is no discharge through appended cavity tube, thus mercury-vapor pressure adjustment with cold-end is made possible; furthermore, mercury-vapor pressure is decreased significantly on energy saving lamps with high power or lamps in high environmental temperature; (2) by adjusting the length and/or position of the cavity tube, mercury-vapor pressure in the lamp tube can be adjusted efficiently; (3) if amalgam is required for the lamp tube, the adjustment work becomes easy and efficient by positioning the amalgam at the coldest point; with adding auxiliary cathode selectively, good luminous flux is formed rapidly when the lamp is turned on initially; (4) the effective service life of the lamp tube is lengthened since the harmful materials to luminous flux output produced during lamp operation are collected at the cold-end of cavity tube.

7 Claims, 5 Drawing Sheets

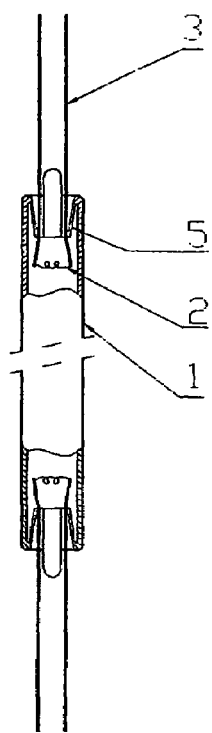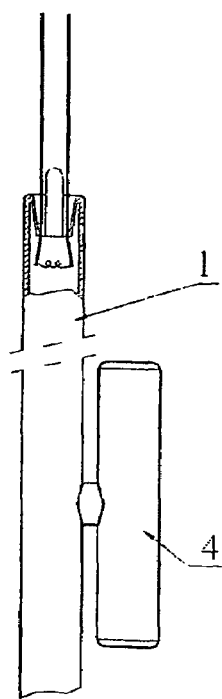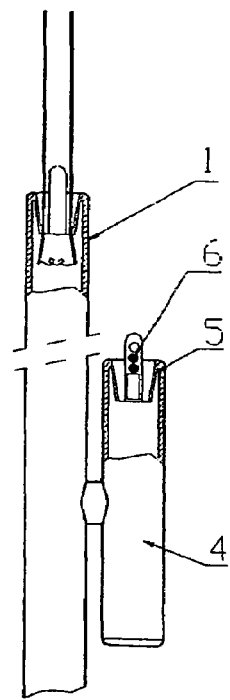
FIG. 1
PRIOR ART
FIG. 2
FIG. 3

FLUORESCENT LAMP WITH CAVITY TUBE

FIELD OF THE INVENTION

This present invention relates to a fluorescent lamp and, in particular, a fluorescent lamp using new cold-end technology or an enveloped fluorescent lamp with high surface load.

BACKGROUND OF THE INVENTION

Existing fluorescent lamps are commonly made up of lamp tube 1, cathode 2, wire 3 and stem cap 5 as shown in FIG. 1. With this type of fluorescent lamp, one end of the wire connected to the cathode is fixed on the stem cap and the other end of the wire is led out from the lamp tube. As a result, the whole inner tube of the fluorescent lamp forms a discharge space, such that mercury-vapor pressure is commonly adjusted by partial tube wall at the coldest point; hence, its shortcomings include (1) relatively small adjustment range: it is impossible to have good effect if condition seriously departs from the norm; (2) difficult to make working state adjustment based on the intersectional effect between amalgam and tube wall at the coldest point for the fluorescent lamp using amalgam.

SUMMARY OF THE INVENTION

The object of the present invention is to provide a fluorescent lamp with optimal capability for adjusting mercury-vapor pressure inside the lamp tube. The fluorescent lamp of the present invention is mainly compact fluorescent lamp or enveloped fluorescent lamp with high surface load. In order to achieve the foregoing object, the new cold-end technology is applied to the lamp tube.

The present invention includes lamp tube, cathode, stem cap and wire. In this fluorescent lamp, one end of the wire connected to the cathode is fixed firmly on the stem cap and the other end of the wire is led out from the lamp tube. At least one cavity tube connecting through the lamp tube is disposed on the side of at least one lamp tube. The stem cap and amalgam which is in the stem cap may be disposed in at least one cavity tube; preferably, the stem cap and amalgam are disposed at one end of the cavity tube. The cathode, stem cap and wire may be disposed in at least one cavity tube, and one end of the wire connected to the cathode is fixed on the stem cap and the other end of the wire is led out from the cavity tube; preferably the stem cap is disposed at one end of cavity tube. The cathode, stem cap, amalgam and wire may be disposed in at least one cavity tube, and one end of the wire connected to the cathode is fixed on the stem cap and the other end of the wire is led out from the cavity tube; amalgam is in the stem cap; preferably the stem cap and amalgam are disposed at one end of cavity tube.

The structures of the fluorescent lamp of the present invention may be applied on the lamp tubes with different diameters and shapes, such as fluorescent lamps with commonly used diameters of 6-25 mm, and with different shapes, such as tubular-type, U-type, H-type, π-type, Buddha's Hand-shape-type, W-type, and SL-type, etc.

The advantages of the present invention includes: (1) the temperature of cavity tube is not influenced directly with electrical arc since there is no discharge through appended cavity tube, thus the real mercury-vapor pressure adjustment with cold-end is made; furthermore, mercury-vapor pressure is decreased greatly on energy saving lamps with high power or lamps in high environmental temperature; (2) by adjusting the length and/or position of cavity tube, mercury-vapor pressure in the lamp tube can be varied efficiently based on the operational condition; (3) if amalgam is required for the lamp tube, the adjustment work becomes easy and efficient by positioning the amalgam at the coldest point; with adding auxiliary cathode selectively, good luminous flux is formed rapidly when the lamp is turned on initially; (4) the effective service life of the lamp tube is lengthened since the harmful materials to luminous flux output produced during lamp operation are collected at cold-end of the cavity tube.

The various objects and advantages of the present invention will be more readily understood from the following detailed description when read in conjunction with the appended drawings.

BRIEF DESCRIPTION OF THE FIGURES

FIG. 1 is a schematic view of prior art compact fluorescent lamp.

FIG. 2 is a schematic view of Example 1 of the present invention.

FIG. 3 is a schematic view of Example 2 of the present invention.

DETAILED DESCRIPTION OF THE PREFERRED EMBODIMENT

APPLICATION EXAMPLE 1

Referring to FIGS. 1 and 2, a parallel cavity tube 4 is disposed on the side of the lamp tube 1 based on the existing compact fluorescent lamp shown in FIG. 1 in the Application Example 1 of the present invention. The cavity tube 4, which is shorter than lamp tube 1 but has same diameter as lamp tube 1, is connected through the lamp tube 1. At least one U-type lamp tube may be applied on lamp tube 1.

APPLICATION EXAMPLE 2

Referring to FIG. 3, this Example is similar to Application Example 1, except that stem cap 5 is disposed on one end of the cavity tube 4 connecting to lamp tube 1, and amalgam 6 is disposed in the stem cap 5.

APPLICATION EXAMPLE 3

Figure 4:
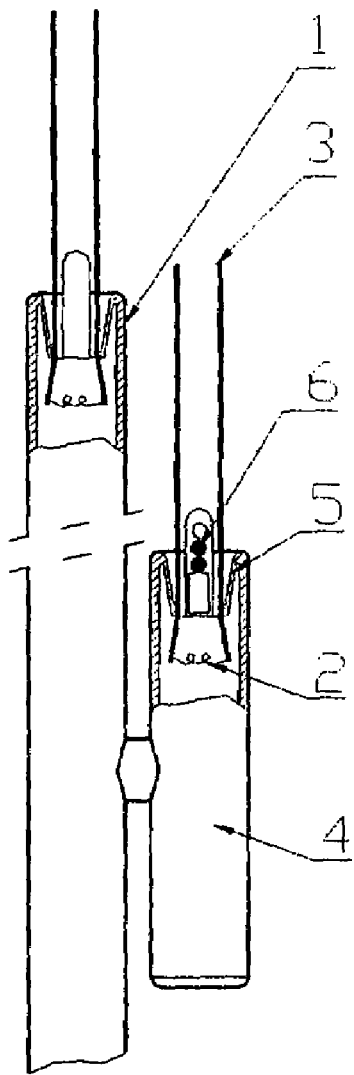
FIG. 4 is a schematic view of Example 3 of the present invention.

Referring to FIG. 4, this example is similar to Application Example 2, except that cathode 2 (heating filament may be applied) is disposed on the stem cap 5; one end of the wire 3 connected to the cathode 2 (or heating filament) is fixed on the stem cap 5 and the other end of the wire 3 is led out from cavity tube 4 connecting to the lamp tube 1; the stem cap 5 and amalgam 6 which is in the stem cap 5, are disposed at one end of cavity tube 4.

APPLICATION EXAMPLE 4

Figure 5:
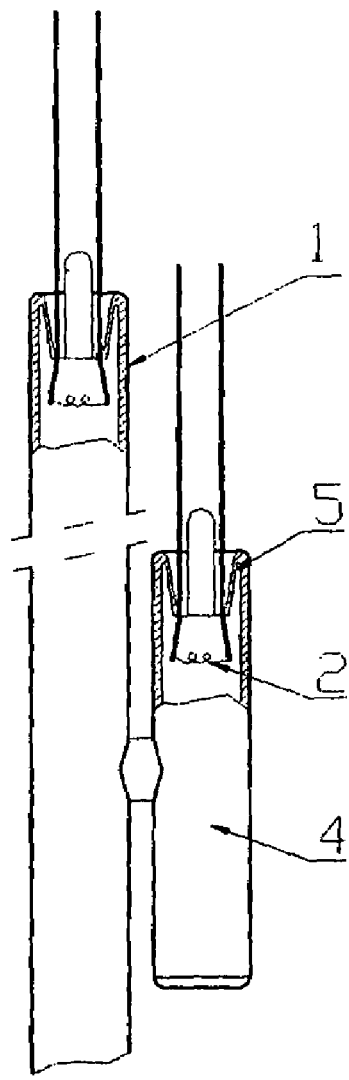
FIG. 5 is a schematic view of Example 4 of the present invention.

Referring to FIG. 5, this Example is similar to Application Example 3, except that there is no amalgam in the stem cap 5. The lamp tube 1 is connected through cavity tube 4 and cathode 2 is disposed on the stem cap.

APPLICATION EXAMPLE 5

Figure 6:
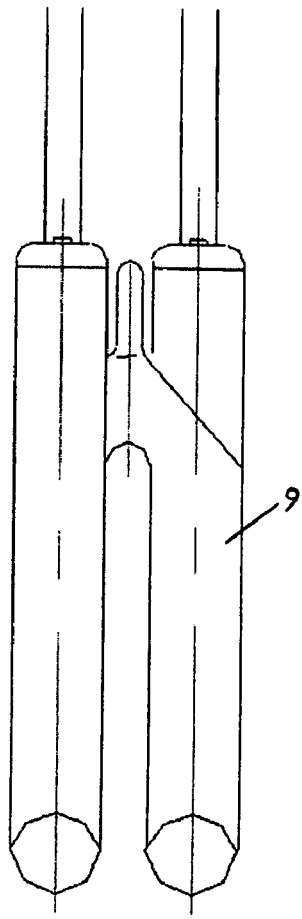
FIG. 6 is a schematic view of W-type lamp tube in Application Example 5 of the present invention.
Figure 7:
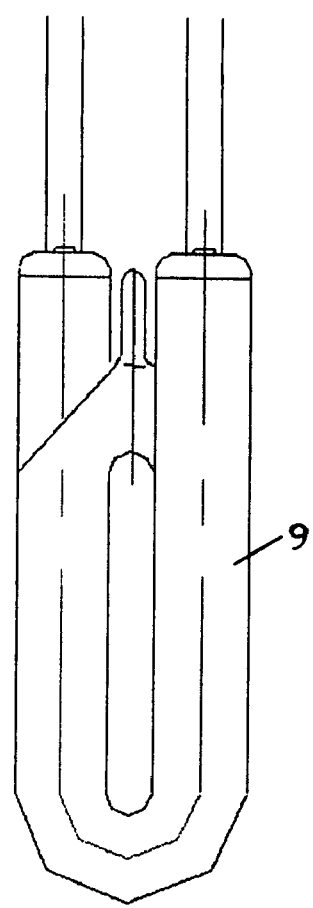
FIG. 7 is a left-side view of FIG. 6.
Figure 8:
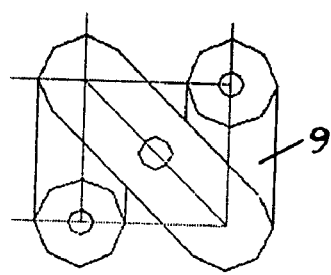
FIG. 8 is a top view of FIG. 6.

Referring to FIGS. 6 to 8, this Example is similar to Application Example 1, except that a W-type lamp tube 9 is applied. Furthermore, the diameter of cavity tube appended on side of the lamp tube is shorter than that of lamp tube.

APPLICATION EXAMPLE 6

Figure 9:
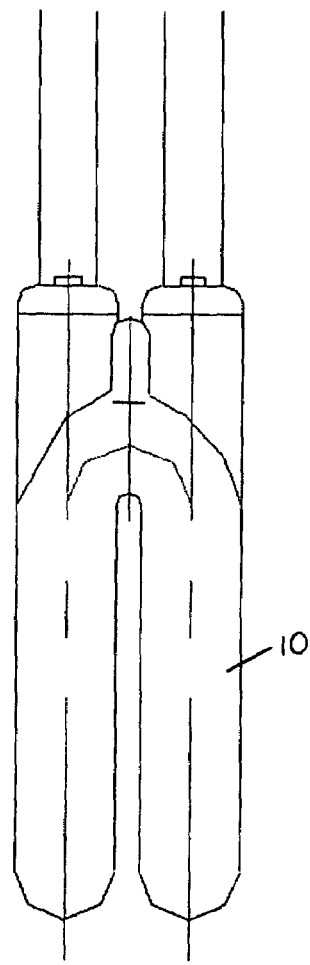
FIG. 9 is a schematic view of SL-type lamp tube in Application Example 6 of the present invention.
Figure 10:
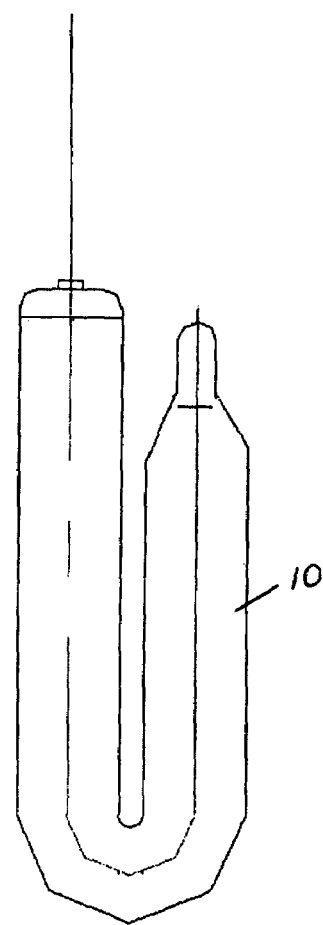
FIG. 10 is a left-side view of FIG. 9.
Figure 11:
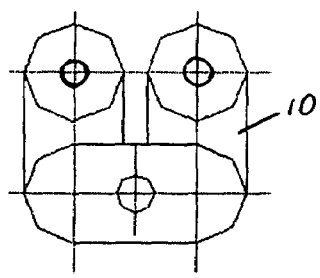
FIG. 11 is a top view of FIG. 9.

Referring to FIGS. 9 to 11, this Example is similar to Application Example 2, except that a SL-type lamp tube 10 is provided.

APPLICATION EXAMPLE 7

Figures 12, 13:
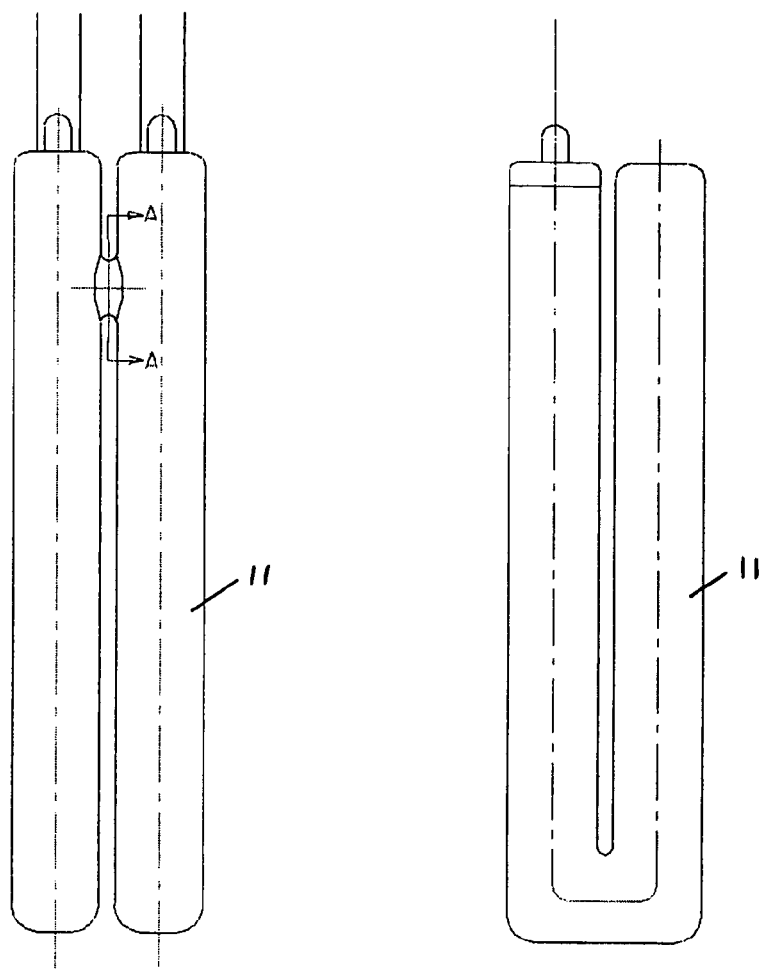
FIG. 12 is a schematic view of 2π-type lamp tube in Application Example 7 of the present invention.
FIG. 13 is a left-side view of FIG. 12.
Figure 14:
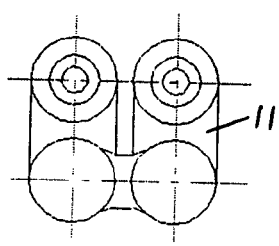
FIG. 14 is a top view of FIG. 12.

Referring to FIGS. 12 to 14, this Example is similar to Application Example 3, except that a 2π-type lamp tube 11 is provided.

APPLICATION EXAMPLE 8

This Example is similar to Application Example 4, except that a H-type or Buddha's Hand-shape-type lamp tube is provided.

It is to be understood that the embodiments depicted in the patent specification herein are not intended to be, nor should it be deemed to be, limited thereby and such other modifications or embodiments without departing from the spirit and essential characteristics of such invention herein are particularly reserved especially as they fall within the breadth and scope of the claims here appended.

What is claimed is:

1. A fluorescent lamp comprising a lamp tube, a cathode, a stem cap and a wire, wherein the cathode is disposed in said lamp tube, one end of said wire connected to said cathode is fixed on said stem cap and the other end of said wire is led out from said lamp tube, and at least one cavity tube connecting through said lamp tube is disposed on the side of at least one said lamp tube.

2. The fluorescent lamp of claim 1, wherein an additional stem cap and an amalgam are disposed in at least one said cavity tube, and said amalgam is disposed inside said stem cap.

3. The fluorescent lamp of claim 2, wherein said additional stem cap and said amalgam are disposed at one end of said cavity tube.

4. The fluorescent lamp of claim 1, wherein the diameter of said lamp tube is 6-25mm.

5. The fluorescent lamp of claim 1, wherein said lamp tube is tubular, U-type, H-type, π-type, Buddha's Hand-shape-type, W-type or SL-type tube.

6. A fluorescent lamp comprising a lamp tube, a cathode, a stem cap, a wire, an amalgam, and at least one cavity tube connecting through said lamp tube disposed on the side of at least one said lamp tube, wherein the cathode, stem cap and wire are disposed in at least one cavity tube, one end of said wire connected to said cathode is fixed on said stem cap and the other end of said wire is led out from said lamp tube, and said amalgam is disposed inside said stem cap.

7. The fluorescent lamp of claim 6, wherein said stem cap and said amalgam are disposed at one end of said cavity tube.

* * * * *